(12) United States Patent
Di Biase

(10) Patent No.: US 8,016,257 B2
(45) Date of Patent: Sep. 13, 2011

(54) TRAILER SUPPORT SAFETY STAND

(76) Inventor: Joseph J. Di Biase, Woodbridge (CA)

( * ) Notice: Subject to any disclaimer, the term of this patent is extended or adjusted under 35 U.S.C. 154(b) by 572 days.

(21) Appl. No.: 11/976,636

(22) Filed: Oct. 26, 2007

(65) Prior Publication Data
US 2009/0108147 A1   Apr. 30, 2009

(51) Int. Cl.
  F16M 11/00   (2006.01)
  A47F 5/00    (2006.01)
  E04G 25/00   (2006.01)
  F16M 13/00   (2006.01)
  A47F 7/00    (2006.01)
  A47J 47/16   (2006.01)
  B62B 3/06    (2006.01)

(52) U.S. Cl. .......... 248/354.1; 248/157; 248/354.3; 248/354.5; 248/354.6; 248/423; 248/407; 248/161; 254/2 B; 254/8 B; 254/133 R; 254/9 B; 254/133 A

(58) Field of Classification Search .......... 248/157, 248/354.1, 354.3, 254.4, 354.5, 354.6, 423, 248/407, 161, 164, 200.1, 351, 354.7, 295.11, 248/309.2, 129, 125.8, 145.6; 254/2 B, 8 B, 254/133, 9 B, 108, 110, 111; 52/122.1
See application file for complete search history.

(56) References Cited

U.S. PATENT DOCUMENTS

| | | | | |
|---|---|---|---|---|
| 1,482,846 A | * | 2/1924 | Harrah | 254/133 R |
| 1,807,351 A | * | 5/1931 | Supan | 254/133 R |
| 3,028,145 A | * | 4/1962 | Brand | 254/134 |
| 3,933,372 A | * | 1/1976 | Herndon | 280/763.1 |
| 4,099,695 A | | 7/1978 | Shinn | |
| 4,169,581 A | | 10/1979 | Thurmond | |
| 4,479,634 A | * | 10/1984 | Blatz | 254/133 R |
| 4,568,064 A | * | 2/1986 | Reinhardt | 254/111 |
| 5,509,687 A | * | 4/1996 | Thorndike | 280/766.1 |
| 5,868,379 A | | 2/1999 | Ellis | |
| 5,901,935 A | * | 5/1999 | Lai | 248/354.1 |
| 6,019,337 A | * | 2/2000 | Brown | 248/354.5 |
| 6,089,544 A | | 7/2000 | Ellis | |
| 6,443,413 B1 | * | 9/2002 | Hawkins et al. | 248/352 |
| 6,641,160 B1 | * | 11/2003 | Veal | 280/414.1 |
| 6,902,148 B1 | * | 6/2005 | Spencer | 254/93 H |
| 7,581,713 B1 | * | 9/2009 | Voss | 254/2 R |

(Continued)

OTHER PUBLICATIONS

Rite-Hite Corporation, TS-2000 Trailer Stand, 2000, pp. 1-2, Catalog No. A14TSSS1207B, Rite-Hite.

(Continued)

*Primary Examiner* — Terrell McKinnon
*Assistant Examiner* — Christopher Garft

(57) ABSTRACT

The present invention relates to a trailer safety stand for temporarily supporting a conventional trailer having a landing gear, wherein the stand comprises a pedestal having a top for engaging the underside of the nose portion of a trailer and a bottom for engaging the ground; means for adjusting the height of the pedestal; a locking device for fixing the height of the pedestal; and means for actuating and de-actuating the locking device. In one embodiment of the present invention, the means for actuating and de-actuating the locking device is a lever that is pivotally connected to the pedestal at a first point along the lever and connected to the locking device at a second point along the lever. When a force is applied away from the pedestal at a third point along the lever, the locking device is actuated and the height of the pedestal is fixed. When a force is applied toward the pedestal at the third point along the lever, the locking device is de-actuated and the height of the pedestal is adjustable.

15 Claims, 4 Drawing Sheets

U.S. PATENT DOCUMENTS

2002/0149249 A1* 10/2002 Horn .................. 297/344.12
2005/0139742 A1* 6/2005 Frisell ................. 248/317

OTHER PUBLICATIONS

TMI Incorporated, Trailer Stands, AUTO RISER™ and ROTO RISER™, 2003, pp. 1-4, Catalog No. AR/RR-03-03, TMI Incorporated, Pittsburgh, PA, United States.

Butler Products, Heavy Duty Trailer Stabilizer HST-400 G-C, 2007, pp. 1-2, Butler Products, 71 Cavalier Blvd., Florence, KY, United States.

Butler Products, Trailer Jack Stand ST-100, 2007, pp. 1-2, Butler Products, 71 Cavalier Blvd., Florence, KY, United States.

* cited by examiner

TRAILER SUPPORT SAFETY STAND

FIELD OF THE INVENTION

The present invention relates to a trailer support safety stand and is particularly concerned with a trailer support safety stand having a locking device for fixing the height of the stand and a means for actuating and de-actuating the locking device.

BACKGROUND OF INVENTION

Landing gear for articulated trailers allows the raising, lowering and support of the forward end of the trailer in the engagement and disengagement from the prime mover (alternatively known as the tractor or truck) and allows the trailer to be freestanding whilst not in transit. In most instances the trailer itself is decoupled from a prime mover and then re-coupled to either the same prime mover or another depending on the logistics appropriate to the use.

A typical scenario is where a trailer is delivered to a loading dock for loading or unloading. The trailer will typically be loaded up to twenty tons in weight, and in some instances up to twenty five tons, on one trailer. The prime mover positions the trailer in the loading dock. The operator will de-latch the kingpin from the turntable (alternatively known as the fifth wheel) and disconnect the service lines. The operator will then manually lower the legs of the landing gear. The operator will then raise the forward end of the trailer to clear the trailer king pin from the turntable of the prime mover. Once the trailer king pin is clear of the prime mover turntable the prime mover can be driven clear of the trailer to leave the trailer freestanding. The prime mover is then typically utilized elsewhere in a more productive role than being idle whilst the trailer is loaded or unloaded. The trailer will then be loaded or unloaded which may take a portion of an hour or it may take several days. Once the trailer is loaded or unloaded, a prime mover will then return to the trailer for the removal from the loading dock.

Under certain conditions of loading and unloading, there is a potential for trailer nose or tail diving. Seldom used or rusted landing gear may collapse under extreme weight conditions. When fork-trucks load or unload at the front of trailers, the trailer can become nose heavy and tip over. An unsupported spotted trailer can collapse with fork truck and diver inside, creating a hazardous situation. Trailer tip over caused by rusted or faulty landing gear can be very costly with injuries to employees, downtime, and loss of product.

Currently, devices known as "trailer jacks" or "trailer stands" are often used to act as a safety support under the front end of a trailer when it is being loaded or unloaded with the trailer resting on its support legs rather than on a tractor fifth wheel or converter dolly. Many of these known devices use mechanical means to adjust the height of the support which are exposed such as cranks and gears that must be ratcheted or cranked up and down. These known devices may fail due to corrosion and friction between gears causing wear. Such devices include the Bulter/Kelly Trailer Stand and T&S Models and the Roto Riser™ trailer stand from TMI Inc. Other devices use hydraulic or pneumatic means to adjust the height of the support. One such device is the AUTO-RISER™ trailer stand from TMI Inc. which uses a gas activated leveling system and a security locking pin. The AUTO-RISER™ trailer stand requires the operator to bend over or to squat down to insert and remove the security locking pin, the act of which may result in injury to the operator.

SUMMARY OF THE INVENTION

An object of the present invention is to provide an improved trailer support safety stand.

A further object of the present invention is to provide a trailer support safety stand with an automatic means for adjusting the height of the stand.

A still further object of the present invention is to provide a trailer support safety stand having a locking device for fixing the height of the stand and means for actuating and de-actuating the locking device.

A still further object of the present invention is to provide a trailer support safety stand with an actuating lever that allows the operator to unlock the stand from a locked position, adjust the height of the stand to a preferred position, and lock it in said preferred position, all while standing upright.

In accordance with one aspect of the present invention, there is provided a trailer support safety stand comprising:
(a) a top plate for engaging the underside of the nose portion of a trailer;
(b) a base pad for engaging the ground;
(c) a post assembly extending upwardly from said base pad to said top plate;
(d) means for adjusting the height of said post assembly;
(e) a locking device for fixing the height of said post assembly; and
(f) means for actuating and de-actuating said locking device.

In an embodiment of the present invention, said top plate is integrally connected to the upper end of said post assembly and said base pad is integrally connected to the lower end of said post assembly.

In an embodiment of the present invention, said post assembly comprises a lower post extending upwardly from said base pad and an upper post extending downwardly from said top plate, said upper post defined by a hollow core configured to slidingly accept said lower post therein such that there is a telescoping arrangement between said upper post and said lower post.

In an embodiment of the present invention, each of said upper and lower posts further comprise at least one aperture, wherein when said upper post is telescopically adjusted relative to said lower post until said at least one upper post aperture is aligned with said at least one lower post aperture, said locking device is insertable through said aligned upper and lower post apertures to fix the vertical position of said upper post relative to said lower post.

In an embodiment of the present invention, said lower post comprises a plurality of apertures disposed along the length thereof in a vertically spaced apart relationship wherein said plurality of lower post apertures are formed in the front wall of said lower post and extend through the back wall of said lower post.

In an embodiment of the present invention, said upper post comprises one aperture formed in the front wall of said upper post and extends through the back wall of said upper post.

In an embodiment of the present invention, said upper post aperture is configured such that when it is aligned with said at least one lower post aperture, it is aligned with two adjacent lower post apertures.

In an embodiment of the present invention, said means for actuating and de-actuating said locking device is moveable between at least a first position wherein said locking device is inserted through said aligned upper and lower post apertures and the vertical position of said upper post is fixed relative to said lower post and at least a second position wherein said locking device is removed from said aligned upper and lower post apertures and the vertical position of said upper post is adjustable relative to said lower post.

In an embodiment of the present invention, said means for actuating and de-actuating said locking device is lever connected at substantially the bottom end thereof to said locking device and extending upwardly therefrom and pivotally connected at a predetermined distance between the top and bottom ends thereof to said upper post such that, when a force is applied to the top end of said lever causing it to move toward said top post, said locking device is removed from said aligned upper and lower post apertures, and when a force is applied to said top end of said lever causing it to move away from said top post, said locking device is inserted through said aligned upper and lower post apertures.

In an embodiment of the present invention, said locking device is a locking pin having a forward end for insertion into and removal from said aligned upper and lower post apertures and a back end that is connected to said lever.

In an embodiment of the present invention, said locking device is pivotally connected to said lever.

In an embodiment of the present invention, the forward end of said locking pin is tapered for easier insertion through said aligned upper and lower post apertures.

In an embodiment of the present invention, said trailer support safety stand further comprises means for guiding said locking pin into and out of said aligned upper and lower post apertures.

In an embodiment of the present invention, said guiding means is connected to said upper post.

In an embodiment of the present invention, said locking pin guiding means comprises a floor extending out from, and perpendicular to, the upper post at a position that is level with the bottom edge of the upper post aperture; two side walls extending up from, and perpendicular to, said floor and arranged in a substantially parallel spaced apart relationship, wherein the distance between the side walls is slightly larger than the width of said locking pin; and an end wall extending up from, and perpendicular to, said floor and arranged substantially perpendicular to each of said two side walls, wherein said end wall limits the continued backward movement of said locking pin once it has been removed from said aligned upper and lower post apertures.

In an embodiment of the present invention, the width of the floor of said guiding means is greater than the distance between the two side walls such that the floor forms a foot pedal for controlling both the vertical direction in which the upper post moves relative to the lower post and the speed of the movement.

In an embodiment of the present invention, said means for adjusting the height of said post assembly is contained within said post assembly.

In an embodiment of the present invention, said means for adjusting the height of said post assembly is an automatic gas activated leveling system.

In an embodiment of the present invention, said means for adjusting the height of said post assembly is a gas shock.

In an embodiment of the present invention, the trailer support safety stand further comprises at least one wheel mounted on said base pad for moving said stand along the ground to and from a position under the nose portion of a trailer.

In an embodiment of the present invention, the trailer support safety stand further comprises at least one handle connected to said post assembly for manually moving said stand to and from a position under the nose portion of a trailer.

In an embodiment of the present invention, said at least one handle comprises at least one grip.

In an embodiment of the present invention, the trailer support safety stand further comprises a foot bar connected to said base pad for tilting said stand off of said base pad onto said at least one wheel for moving said stand to and from a position under the nose portion of a trailer.

In an embodiment of the present invention, said base pad of said trailer stand comprises at least one hole to drain rainwater collected thereon.

In accordance with another aspect of the present invention, there is provided a trailer support safety stand for temporarily supporting a conventional trailer having a landing gear, said stand comprising a pedestal having a top for engaging and supporting the underside of the nose portion of a trailer; a bottom for engaging the ground; means for adjusting the height of said pedestal; a locking device for fixing the height of said pedestal; and means for actuating and de-actuating said locking device.

In an embodiment of the present invention, said means for adjusting the height of the pedestal is contained within said pedestal.

In an embodiment of the present invention, said means for adjusting the height of the pedestal is an automatic gas activated leveling system.

In an embodiment of the present invention, said means for adjusting the height of the pedestal is a gas shock.

In an embodiment of the present invention, said means for actuating and de-actuating said locking device is a lever pivotally connected to said pedestal at a first point along said lever and connected to said locking device at a second point along said lever such that, when a force is applied at a third point along said lever away from said pedestal, said locking device is actuated and the height of said pedestal is fixed, and when a force is applied at the third point along said lever toward said pedestal, said locking device is de-actuated and the height of the pedestal is adjustable.

In an embodiment of the present invention, the trailer support safety stand further comprises wheel means mounted at substantially said bottom of said pedestal for moving said stand along the ground to and from a position under the nose portion of a trailer.

In an embodiment of the present invention, said wheel means comprises at least one wheel.

In an embodiment of the present invention, said trailer support safety stand further comprises at least one handle connected to said pedestal whereby the pedestal is manually moveable to and from a position under the nose portion of a trailer.

Advantages of the trailer support safety stand of the present invention comprise the following:

1. It provides a safe and secure support when placed under the nose of a spotted semi-trailer at the loading dock and is designed to help prevent accidents caused by trailer tip-over and landing gear collapse.
2. It is a rugged support that helps make the loading dock safer.
3. It allows the trailer to remain supported and minimizes the dangerous condition of seldom used or rusted landing gear collapsing under extreme weight conditions.
4. In one embodiment, it uses an exclusive gas activated leveling system to adjust the height of the stand, which system requires no cranking, no electricity and no pressurized air. It is virtually maintenance free, easy to use and guaranteed to about 1 million cycles. Easier operation helps insure proper use and increases safety.

5. In one embodiment, it uses a lever to engage and disengage the locking device. Engaging the locking device locks the stand at a preferred height while disengaging the locking device allows the height of the stand to be adjusted.

6. It is simple to use. The unit is lowered using the foot and it is rolled to the underside of the trailer. While standing upright, the operator releases the locking device by moving the actuating lever. Upon release of the locking device, the stand automatically raises to meet the underside of the trailer at which point the operator, still standing upright, moves the actuating lever in the opposite direction thus engaging the locking device and fixing the stand into its stabilizing position. In one embodiment of the present invention, the stand, when fixed into its stabilizing position, has an allowance for a ½" downward telescopic movement of the upper post relative to the lower post. This is key to prevent the locking pin from becoming difficult to remove.

7. The exclusive gas activated leveling system and security locking pin safety feature allow for it to be the easiest trailer stand to operate in the business.

8. It is designed to fit all types of trailers that may come into the loading dock.

9. In one embodiment, it is designed with a foot bar to help with ease of positioning and to be more ergonomic.

10. In one embodiment, it is designed with double positioning handles with vinyl grips to allow the stand to be moved and positioned with great accuracy even in snow, sleet and loose gravel.

11. Only one stand is required per trailer.

12. The extra large base pad maintains trailer stability even during hot weather when asphalt can sink under the weight of a loaded trailer.

13. The combination of the large, semi-pneumatic rubber tires and wide positioning handles makes this stand extremely easy and quick to maneuver, position and adjust, even in the most adverse weather conditions.

14. Combined, all of its unique features make the operation of this stand extremely safe, easy and efficient.

Other and further advantages and features of the invention will be apparent to those skilled in the art from the following detailed description thereof, taken in conjunction with the accompanying drawings.

BRIEF DESCRIPTION OF THE DRAWINGS

The present invention will be further understood from the following detailed description with reference to the drawings in which.

Figure 1:
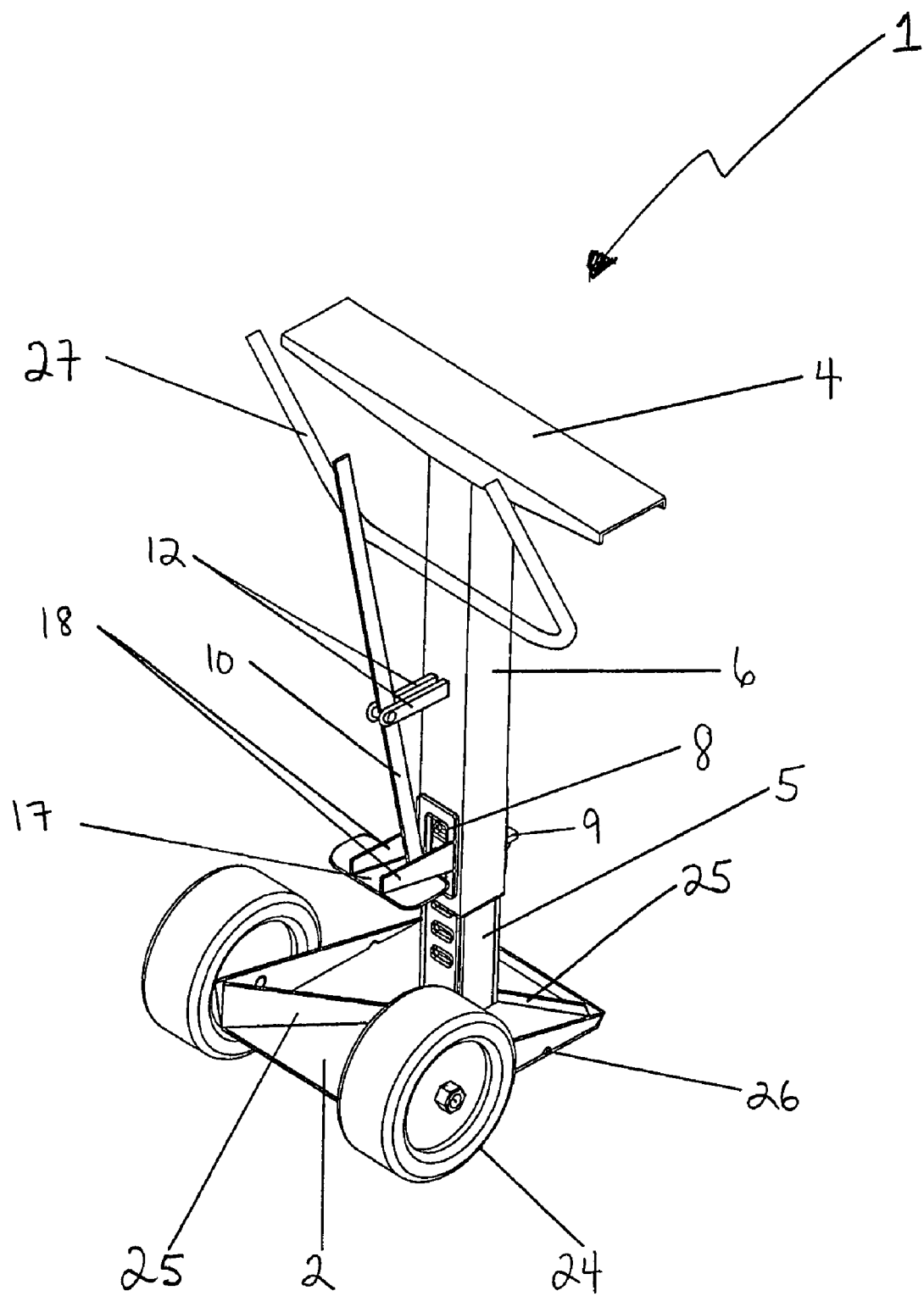
FIG. 1 is a perspective view of a trailer support safety stand in the locked position in accordance with an embodiment of the present invention.

Similar references are used in different figures to denote similar components.

DETAILED DESCRIPTION OF THE PREFERRED EMBODIMENTS

Further details of the preferred embodiments of the present invention are illustrated in the following examples which are understood to be non-limiting.

Referring to FIGS. 1 to 4, the trailer safety support stand 1 of the present invention comprises a base pad 2 for engaging a surface. The base pad is of sufficient area and shape to support the load. In an embodiment of the present invention, the trailer support safety stand has a static load capacity of about 100,000 lbs. In most instances the use location will have a solid or hard packed surface, suitable for vehicular traffic. The area of the base pad is defined by the length of base width and the length of base depth. The combination of base width and base depth are sufficient to provide an adequate area for supporting the load without the stand sinking into the surface. In the exemplary embodiments, the base pad is a flat member having a rectangular shape made of heavy gauge steel construction. In one embodiment of the present invention, the dimensions of the base pad are 16"×20". In another embodiment of the present invention, the dimensions of the base pad are 17"×18.5".

A post assembly 3, having a lower end and an upper end, extends upwardly from the base pad to a top plate 4 running perpendicular to the post assembly for receiving the underside of the nose portion of a trailer. The lower end of the post assembly is secured, in one embodiment as by welding, to the base pad to restrict motion between the post assembly and the base pad while the load is applied. The upper end of the post assembly is secured, in one embodiment as by welding, to the top plate to restrict motion between the post assembly and the top plate while the load is applied. In another embodiment, the base pad and the top plate are integral with the post assembly. In the exemplary embodiments, the top plate is an inverted U-shaped member made of heavy gauge steel construction. In one embodiment of the present invention, the dimensions of the top plate are 6'×30". In another embodiment of the present invention, the dimensions of the top plate are 5'×30".

In the exemplary embodiments, the post assembly consists of a lower post 5 extending upwardly from the base pad and an upper post 6 extending downwardly from the top plate. The lower post is a tubular member having a square cross-sectional shape and, in one embodiment, is made of heavy gauge steel construction. The upper post is a hollow tubular member having a square cross-sectional shape and having slightly larger dimensions than those of the lower post such that it is configured to slidingly accept the lower post therein providing a telescoping arrangement between the two. In one embodiment of the present invention, the upper post is made of heavy gauge, 5½" square, steel construction.

In the exemplary embodiments, the lower post comprises a plurality of apertures 7 disposed along the length thereof arranged in a vertically spaced apart relationship that are formed in the front of the lower post and extend through the back of the lower post. The lower post apertures have a rounded rectangular shape. The upper post comprises a single aperture 8 formed in the front of the upper post and extending through the back of the upper post. The upper post aperture optionally aligns with the plurality of lower post apertures for fixing the vertical position of the upper post relative to the lower post by a locking device. The upper post aperture has a rounded rectangular shape and is of a size such that, when aligned with the plurality of lower post apertures, it is simultaneously aligned with two vertically adjacent lower post apertures.

Figures 4, 5:
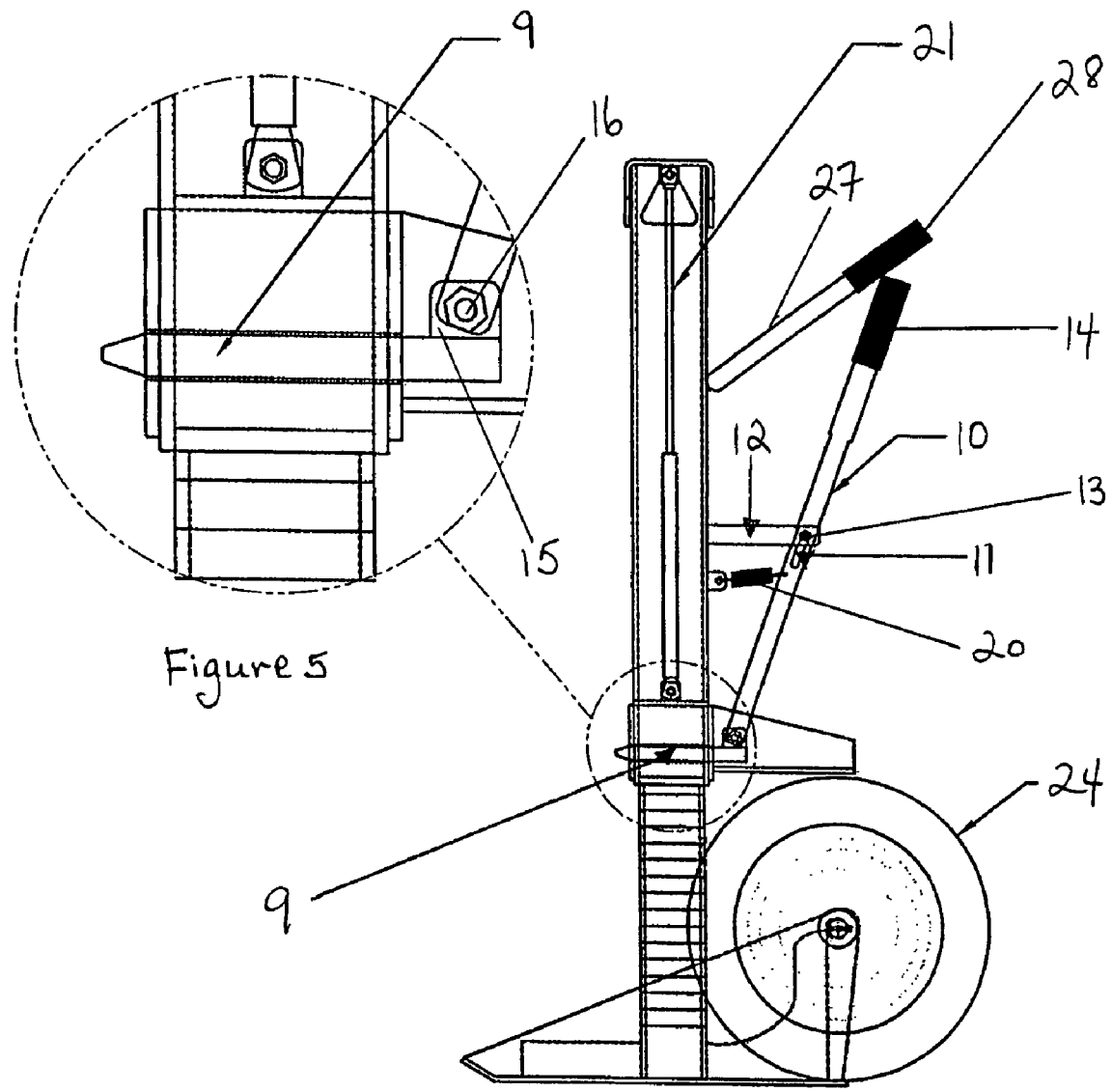
FIG. 4 is a cross-sectional side view of the trailer support safety stand of FIG. 2.
FIG. 5 is an exploded view of the locking pin of FIG. 4.

Referring now to FIGS. 4 and 5, the locking device is a locking pin 9 having slightly smaller dimensions than those of the lower post apertures such that the locking pin is insertable through the aligned upper and lower post apertures to fix the vertical position of the upper post relative to the lower post. Preferably, the locking pin is inserted through the upper post aperture and the bottom aperture of the two vertically adjacent lower post apertures. In the exemplary embodiment, the locking pin has a rounded rectangular cross-sectional shape; the forward end of which is tapered to provide for easier insertion through the aligned upper and lower post apertures. In one embodiment, when the vertical position of the upper post relative to the lower post is fixed by the locking pin, there is still allowance for a ½" downward telescopic movement of the upper post relative to the lower post in order to make it easier to remove the locking pin from the aligned upper and lower post apertures.

Figure 2:
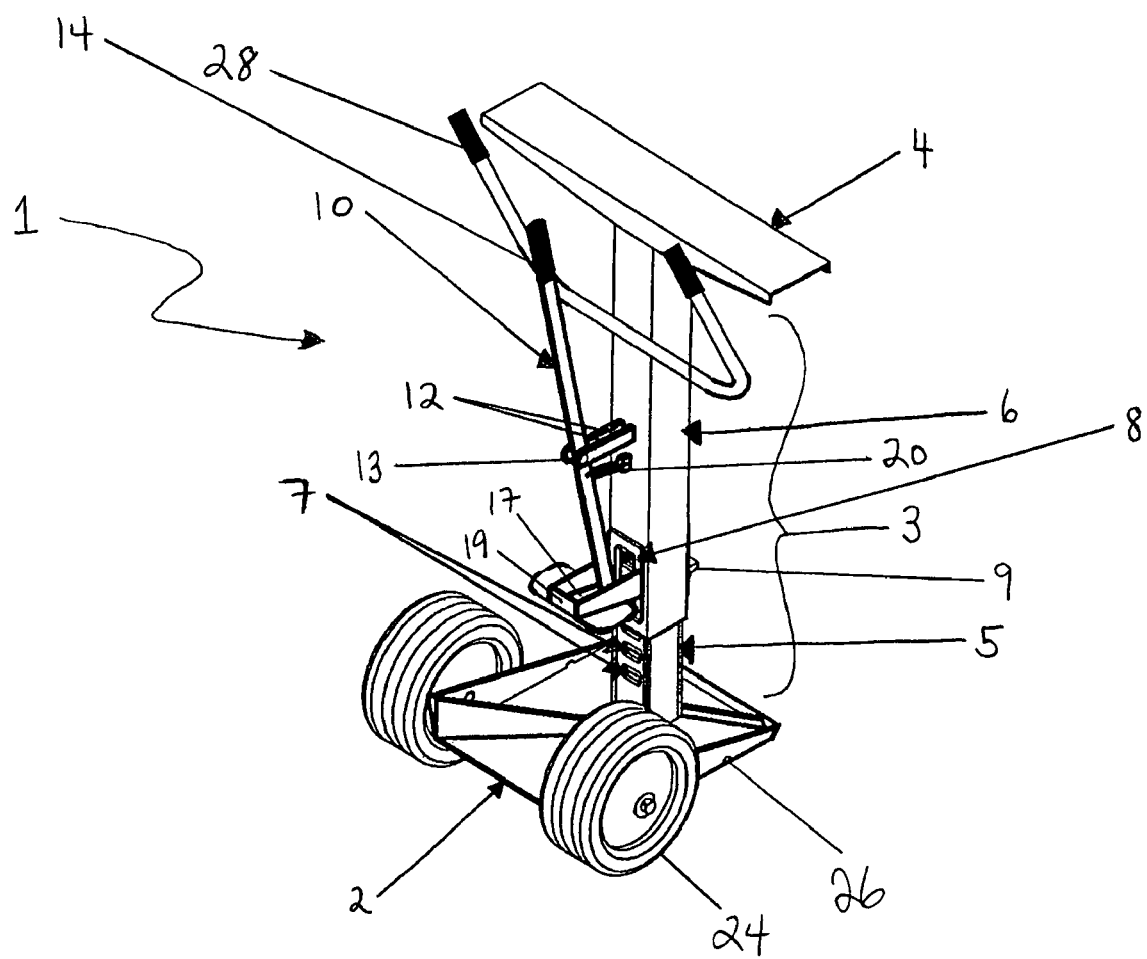
FIG. 2 is a perspective view of a trailer support safety stand in the locked position in accordance with another embodiment of the present invention.
Figure 3:
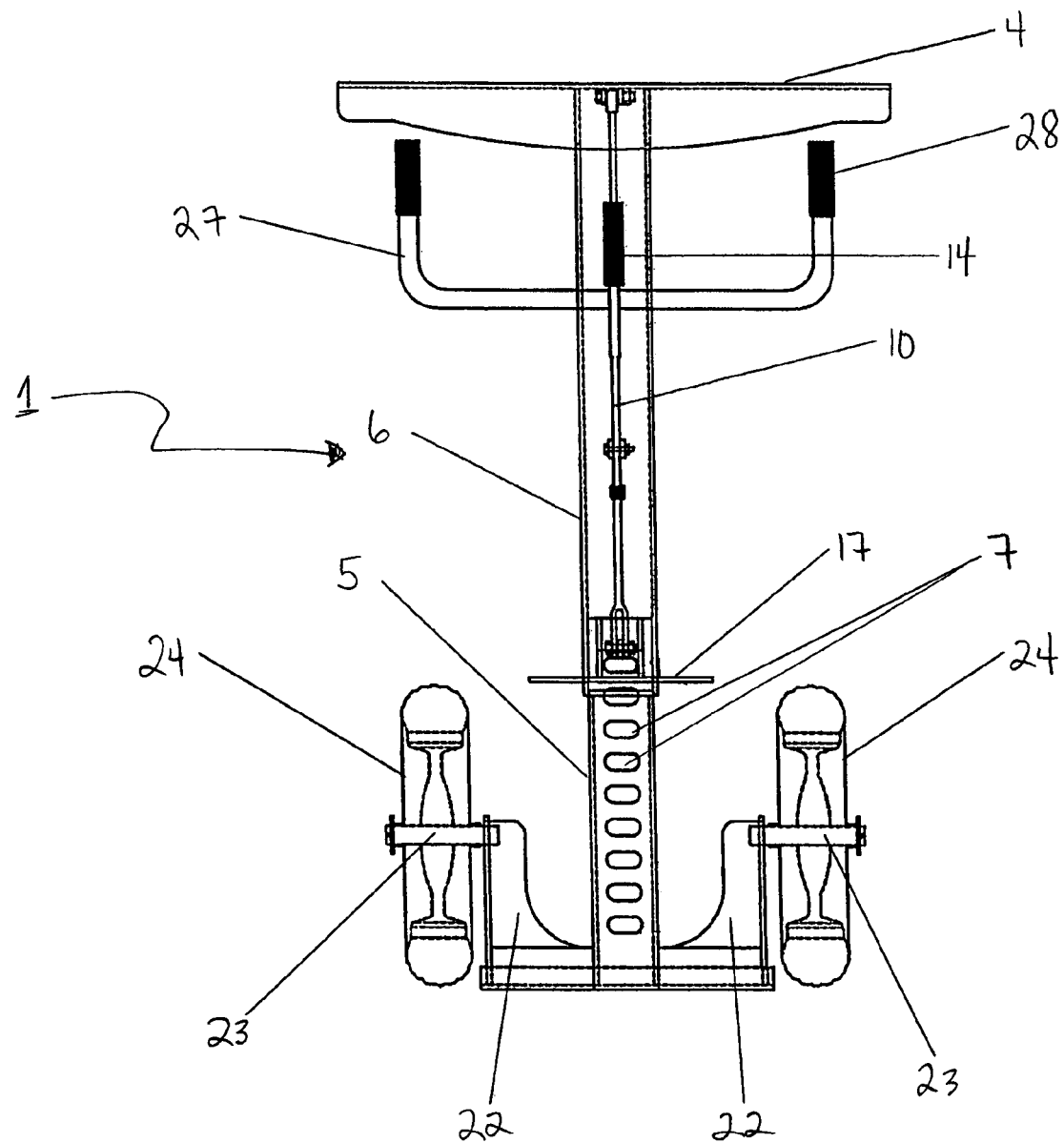
FIG. 3 is a cross-sectional front view of the trailer support safety stand of FIG. 2.

The trailer support safety stand further comprises means for actuating said locking device. The actuating means is moveable between at least a first position wherein said locking device is engaged with said post assembly, thus securing the height of said post assembly and at least a second position wherein said locking device is disengaged from said post assembly, thus allowing adjustment of the height of said post assembly. Referring now to FIGS. 1, 2 and 4, the actuating means is a vertically arranged lever 10 connected at the bottom end thereof to said locking pin and pivotally connected to said upper post at a predetermined distance along said lever up from said locking pin such that when the top end of said lever is moved toward the upper post, the locking pin is removed from the aligned upper and lower post apertures, and when the top end of the lever is moved away from the upper post, the locking pin is inserted through the aligned upper and lower post apertures. In the exemplary embodiments, the lever is a flat bar having an aperture 11 therein, and the pivotal connection between the lever and the upper post consists of two side members 12 extending out from the upper post to either side of the lever at the location of the aperture and a fastener 13, in one embodiment a bolt, running through the side members and the aperture for pivoting therein. Referring now to FIGS. 2, 3 and 4, the lever may have a grip 14 at the top end thereof for the operator's hand(s).

Referring now to FIGS. 4 and 5, the lever may be pivotally connected to said locking pin. The pivotal connection between the lever and the locking pin consists of the bottom end of the lever being attached to a flange 15 on the back end of the locking pin via a fastener 16, in one embodiment a bolt.

The trailer support safety stand may further comprise means for guiding said locking pin into and out of said aligned upper and lower post apertures. Referring to FIG. 1, the guiding means comprises a floor 17 extending out from, and perpendicular to, the upper post at a position that is level with the bottom edge of the upper post aperture; and two side walls 18 extending up from, and perpendicular to, the floor and arranged in a substantially parallel spaced apart relationship. The two side walls are spaced apart at a distance slightly larger than the width of the locking pin. Referring now to FIG. 2, the guiding means may also comprise an end wall 19 extending up from, and perpendicular to, the floor and arranged substantially perpendicular to each of said two side walls. The end wall is located between the two side walls at a predetermined distance from said upper post such that the locking pin can be removed from said aligned upper and lower post apertures, but once said locking pin is removed, its continued movement in that direction is inhibited. The floor of the guiding means may be secured, in one embodiment as by welding, to the upper post; the two side walls may be secured, in one embodiment by welding, to the floor and the upper post; and the end wall may be secured, in one embodiment by welding, to the floor and the two side walls. Referring now to FIGS. 1 and 2, the width of the floor of said guiding means may be greater than the distance between the two side walls such that the floor on the outside of the guiding means forms a foot pedal for the operator to allow the operator to control both the direction in which the upper post moves relative to the lower post and the speed of the movement.

The trailer support safety stand may comprise means for biasing the lever in a direction towards the upper post. Referring now to FIGS. 2 and 4, the biasing means is a spring 20 connected at one end thereof to the upper post and connected at the other end thereof to the lever at a predetermined distance between the pivotal connection to the upper post and the connection to the locking pin. The biasing means functions to hold the locking pin in place in the locked position while the stand is being maneuvered.

The trailer support safety stand further comprises means for adjusting the height of said post assembly. Referring now to FIG. 4, the adjusting means is contained within said upper post and is an automatic gas activated leveling system 21, in one embodiment a gas shock. In one embodiment of the present invention, the trailer support safety stand has an overall retracted length of about 42". In another embodiment of the present invention, the trailer support safety stand has an overall extended length of about 55". In a further embodiment of the present invention, the trailer support safety stand has overall extended length of about 53".

Referring now to FIG. 3, two wheel support brackets 22 are secured, in one embodiment by welding, to the adjacent corners of the rectangular base pad and extend upwardly therefrom. These brackets support axles 23 upon which wheels 24 are journalled for rotation and it will be observed that the lower peripheries of the wheels are situated just at the lower surface of the base pad when it is situated upon a supporting surface in a horizontal position. In one embodiment of the present invention (not illustrated), the wheel support brackets support a single axle upon which the wheels are journalled for rotation; the single axle extending across the entire width of the base pad between the wheels. In this embodiment, the single axle forms a bar upon which the operator can place his/her foot to facilitate the tilting of the stand off of its base pad and onto its wheels and vice versa. In another embodiment of the present invention, the wheels are 16" diameter solid rubber tires. In a further embodiment of the present invention, the wheels are 10" diameter semi-pneumatic rubber tires.

Referring now to FIGS. 1 and 2, four base pad stabilizers 25 extend up from, and perpendicular to, the base pad, each one running diagonally from a corner of the base pad to the lower post to provide stability and rigidity to the base pad. The base pad stabilizers are secured, in one embodiment by welding, to the base pad and lower post. The base pad comprises holes 26 to drain rainwater collected thereon. In one embodiment of the present invention, the base pad comprises four such drain holes.

Referring now to FIGS. 1 to 4, a handle 27 extends from one side of the post assembly. It extends from the post assembly on the same side as the wheels so that the stand can readily be tipped onto the wheels, maneuvered from one location to the other, and tipped back onto the base pad. In the exemplary embodiments, the handle is in the form of a U- or C-shape, thus providing dual positioning handles. In one embodiment, the dual positioning handles are each 16" long. Referring now to FIGS. 2, 3 and 4, the handle may comprise grips 28 for the operator's hand(s).

In the operation of the trailer support safety stand, according to one embodiment of the present invention, the operator places his/her foot on the foot bar, grabs the double positioning handles and tilts the stand toward himself/herself off of the base pad and onto its wheels, removes his/her foot from the foot bar, wheels the stand into the proper supporting position relative to the nose portion of a trailer, places his/her foot back on the foot bar, and tilts the stand back onto its base pad. The stand is positioned so that the top plate will engage the underside of the nose portion of the trailer when the stand is raised. The operator places his/her foot on the foot pedal and applies a downward force thus taking advantage of the allowance for the ½" downward telescopic movement of the upper post relative to the lower post, thus making it easier for the locking pin to be disengaged from the post assembly. While applying the downward force, the top of the lever is pushed toward the upper post thus moving the bottom of the lever away from the upper post and causing the locking pin to be removed from the aligned upper and lower post apertures. Accordingly, the locking pin is disengaged from the post assembly. This allows the operator to raise the upper post to the desired position such that the top plate engages or is positioned just below the underside of the nose portion of the trailer. The operator controls the direction and speed of the movement of the upper post relative to the lower post with his/her foot on the foot pedal. When the stand has been raised to the desired position, the top of the lever is then pulled away from the upper post thus moving the bottom of the lever toward the upper post and causing the locking pin to be inserted through the aligned upper and lower post apertures. Accordingly, the locking pin is engaged with the post assembly and the upper post is locked against movement in either vertical direction relative to the lower post. If desired, the trailer landing gear may then be lowered to further enhance the stability of the trailer.

While the foregoing provides a detailed description of preferred embodiments of the present invention, it is to be understood that this description is illustrative only of the principles of the invention and not limitative. Furthermore, as many changes can be made to the invention, such as changes in the shape, size and arrangement of parts, without departing from the spirit of the invention or the scope of the subjoined claims.

The embodiments of the invention in which an exclusive property or privilege is claimed are as follows:

1. A trailer support safety stand for supporting the detached trailer portion of a semi-trailer or the like, said trailer portion having a landing gear, said stand comprising: (a) a top plate for engaging the underside of the nose portion of said trailer; (b) a base pad for engaging the ground; (c) a post assembly comprising a lower post extending upwardly from said base pad and an upper post extending downwardly from said top plate, said upper post having an upper end and a lower end and defined by a hollow core configured to slidingly accept said lower post therein such that there is a telescoping arrangement between said upper and lower posts, wherein each of said upper and lower posts further comprise at least one aperture; (d) means for adjusting the height of said post assembly and said stand; (e) a locking device for fixing the height of said post assembly and said stand wherein when said upper post is telescopically adjusted relative to said lower post until said at least one upper post aperture is aligned with said at least one lower post aperture, said locking device is insertable through said aligned upper and lower post apertures to fix the vertical position of said upper post relative to said lower post; and (f) a lever for actuating and de-actuating said locking device, said lever connected at a first position at substantially the bottom end thereof to said locking device and extending upwardly therefrom and pivotally connected at a second position at a predetermined distance between the top and bottom ends thereof to said upper post such that, when a force is applied to the top end of said lever causing it to move toward said upper end of said upper post, said locking device is removed from said aligned upper and lower post apertures, and when a force is applied to said top end of said lever causing it to move away from said upper end of said upper post, said locking device is inserted through said aligned upper and lower post apertures, wherein said stand provides supplementary support for said trailer portion, separate from and in addition to, said landing gear.

2. The stand of claim 1, wherein said at least one lower post aperture is a plurality of apertures disposed along the length of said lower post in a vertically spaced apart relationship and wherein said plurality of lower post apertures are formed in the front wall of said lower post and extend through the back wall of said lower post.

3. The stand of claim 2, wherein said at least one upper post aperture is a single aperture formed in the front wall of said upper post and extends through the back wall of said upper post.

4. The stand of claim 3, wherein said single upper post aperture is configured such that, when it is aligned with said plurality of lower post apertures, it said single upper post aperture is aligned with two adjacent lower post apertures.

5. The stand of claim 4, wherein said locking device is a locking pin having a forward end for insertion into and removal from said aligned upper and lower post apertures and a back end that is connected to said lever.

6. The stand of claim 5, wherein said locking pin is pivotally connected to said lever.

7. The stand of claim 6 further comprising means for guiding said locking pin into and out of said aligned upper and lower post apertures.

8. The stand of claim 7 further comprising means for biasing the lever in a direction towards the upper post.

9. The stand of claim 8, wherein said means for adjusting the height of said post assembly is contained within said post assembly.

10. The stand of claim 9, wherein said means for adjusting the height of said post assembly is an automatic gas activated levelling system.

11. The stand of claim 10, wherein said automatic gas activated levelling system is a gas shock.

12. The stand of claim 11 further comprising at least one wheel mounted on said base pad for moving said stand along the ground to and from a position under the nose portion of a trailer.

13. The stand of claim 12 further comprising at least one handle connected to said post assembly for manually moving said stand to and from a position under the nose portion of a trailer.

14. The stand of claim 13 further comprising a foot bar connected to said base pad for facilitating the tilling of said stand of said base pad onto said at least one wheel and back again.

15. A stand for supporting the detached trailer portion of a semi-trailer or the like, said trailer portion having a landing gear, said stand comprising a pedestal having a top for engaging and supporting the underside of the nose portion of a trailer and a bottom for engaging the ground; means for adjusting the height of said pedestal and said stand; a locking device for fixing the height of said pedestal and said stand; and a lever for actuating and de-actuating said locking device, said lever pivotally connected to said pedestal at a first point along said lever and connected to said locking device at a second point along said lever such that, when a force is applied away from said top of said pedestal at a third point along said lever, said locking device is actuated and the height of said pedestal is fixed, and when a force is applied toward said top of said pedestal at the third point along said lever, said locking device is de-actuated and the height of the pedestal is adjustable, wherein said stand provides supplementary support for said trailer portion, separate from and in addition to, said landing gear.

* * * * *